United States Patent [19]

Kovarik

[11] Patent Number: 5,633,923
[45] Date of Patent: May 27, 1997

[54] AUTOMATIC CALL DISTRIBUTION SYSTEM WITH DISPLAY DATA STORAGE COMPRESSION SYSTEM AND METHOD

[75] Inventor: Karla Kovarik, Naperville, Ill.

[73] Assignee: Rockwell International Corporation, Seal Beach, Calif.

[21] Appl. No.: 975,022

[22] Filed: Nov. 12, 1992

[51] Int. Cl.$^6$ .................. H04M 3/00; G09G 5/00; H01J 31/00
[52] U.S. Cl. .................. 379/265; 345/3; 345/185; 364/237.2; 379/309; 395/792; 395/501
[58] Field of Search ............ 345/1, 2, 3, 132, 345/185, 192, 202; 379/265, 266, 309; 395/148, 149, 153, 162; 364/237.2

[56] References Cited

U.S. PATENT DOCUMENTS

| | | | |
|---|---|---|---|
| 4,833,596 | 5/1989 | Buckland et al. | 364/237.2 X |
| 5,109,487 | 4/1992 | Ohgomori et al. | 395/148 X |
| 5,159,683 | 10/1992 | Lvovsky et al. | 345/3 X |
| 5,247,614 | 9/1993 | Eagen et al. | 395/162 X |
| 5,374,940 | 12/1994 | Corio | 345/1 |
| 5,481,276 | 1/1996 | Dickey et al. | 345/3 X |

*Primary Examiner*—Krista M. Zele
*Assistant Examiner*—Harry S. Hong
*Attorney, Agent, or Firm*—Welsh & Katz, Ltd.

[57] ABSTRACT

An automatic call distribution system (10) with a plurality of different types of display terminals (18, 20) which require display data to be presented to them in different formats employs a formatter (26) which selectively uses formatting information (24) to construct formatted data from unformatted display data in a memory (22) into a formatted display data buffer (28) in accordance with the appropriate formatting information for the particular type of display terminal at which the data is to be displayed and then conveys the buffered data to the display terminal (18, 20) in the appropriate format.

20 Claims, 1 Drawing Sheet

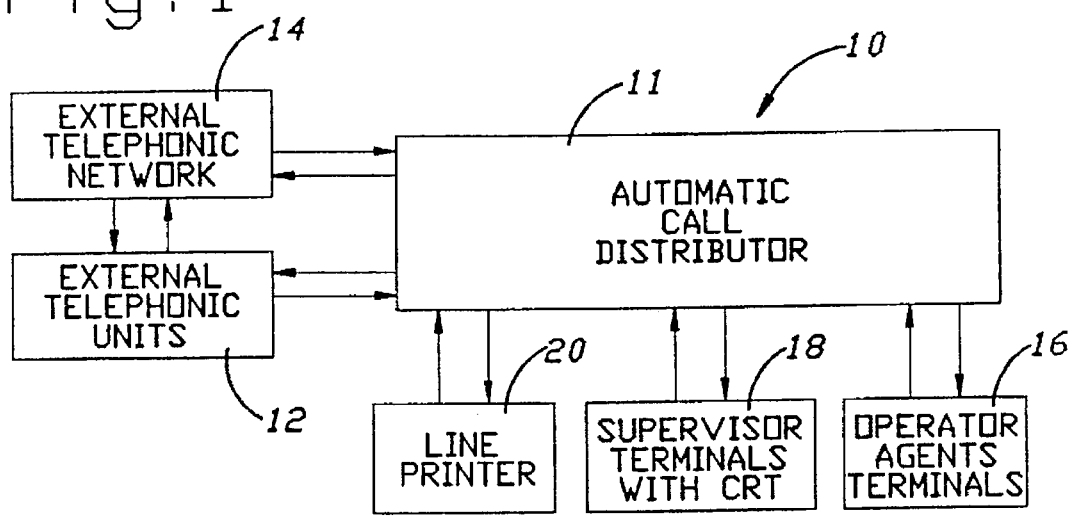
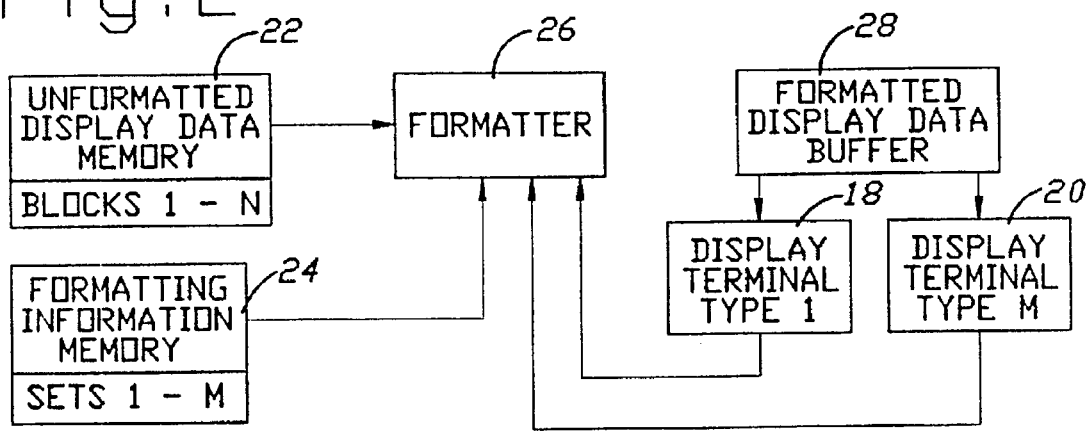
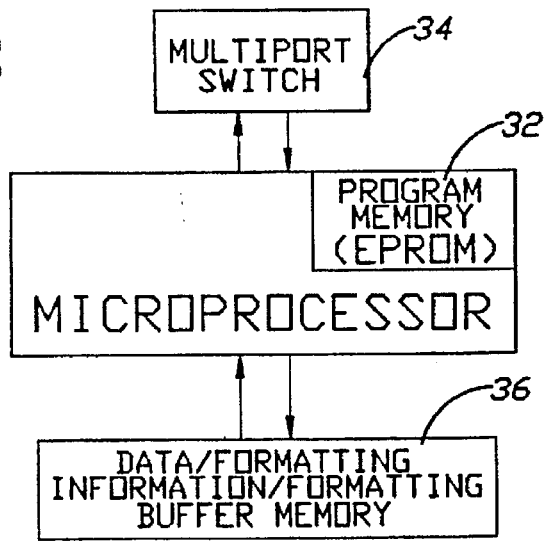

AUTOMATIC CALL DISTRIBUTION SYSTEM WITH DISPLAY DATA STORAGE COMPRESSION SYSTEM AND METHOD

BACKGROUND OF THE INVENTION

1. Field of the Invention

This invention relates to automatic call distributors and, more particularly, to such distributors with different types of display terminals requiring different formats: for display of data at the terminal.

2. Description of the related art including information disclosed under 37 CFR 1.97–1.99

Automatic call distributors, such as the ones shown in patent application U.S. Ser. No. 07/770,197 of Jones et al. entitled "Multichannel Telephonic Switching Network With Different Signaling Formats and Connect/PBX Treatment Selectable For Each Channel", filed Oct. 2, 1991; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992 and U.S. Pat. No. 5,127,004 of Lenihan et al. entitled "Tone and Announcement Message Code Generator for a Telephonic Switching System and Method", issued Jun. 30, 1992, are well known.

In such distributors, it is known to provide different types of display terminals, such as a CRT display terminal for a supervisor with scrolling capability and a line printer without scrolling characteristics. In such distributors, display of the same textual information or other data at different types of display terminals is required to be provided to the different display terminals in different formats. In known distributors, this is achieved through duplication of storage of the same data in different formats needed for the different; display devices. This disadvantageously results in excessive inefficient use of storage capacity.

SUMMARY OF THE INVENTION

It is therefore the principal object of the principal object of the present invention to overcome the disadvantage of duplicate storage of data in known automatic call distributors by providing an automatic call distributor with a display data storage compression system and method of storing display data which avoids multiple storage of the same data merely in order to provide the data in different formats to different display terminals.

This objective is achieved through provision of an automatic call distributor having a plurality of different types of display terminals for display of data relating to operation of the distributor, a display data storage compression system having means for storing data in unformatted form for display at different types of display terminals, means for storing formatting information relating to different types of formats associated with the different types of display terminals and means for selectively using the formatting information to provide the stored data to the different types of terminals in the different formats respectively associated with the different types of display terminals.

Preferably, the formatted stored data means includes a formatter for constructing formatted data corresponding to the unformatted data independently of the actual display terminal at which the formatted data is to be displayed in a format associated with the display terminal type of the actual data terminal.

The object of the present invention is also achieved by providing a display data storage compression method, comprising the steps of (1) storing data in unformatted form for display at different types of display terminals, (2) storing formatting information relating to different types of formats associated with the different types of display terminals, and (3) selectively using the formatting information to provide the stored data to the different types of terminals in the different formats respectively associated with the different types of display terminals.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 1 is a functional block diagram of the automatic call distribution system of the present invention in which the data storage compression system is employed;

FIG. 2 is a simplified functional block diagram of the display data storage communication system;

FIG. 3 is a functional block diagram of the automatic call distributor block of FIG. 2.

DESCRIPTION OF THE PREFERRED EMBODIMENT

Referring now to FIG. 1, the display data storage compression system and method of the present invention is preferably employed and incorporated into an automatic call distribution system 10 which functions to selectively and automatically interconnect a plurality of external telephonic units 12 of an external telephonic network 14 to a plurality of operator agents terminals 16. For a more detailed discussion of automatic call distributors of the type like automatic call distribution system 10, reference should be made to patent application U.S. Ser. No. 07/770,197 of Jones et al. entitled "Multichannel Telephonic Switching Network With Different Signaling Formats and Connect/PBX Treatment Selectable For Each Channel", filed Oct. 2, 1991; U.S. Pat. No. 5,140,611 of Jones et al. entitled "Pulse Modulated Self-Clocking and Self-Synchronizing Data Transmission and Method for a Telephonic Communication Switching System", issued Aug. 8, 1992 and U.S. Pat. No. 5,127,004 of Lenihan et al. entitled "Tone and Announcement Message Code Generator for a Telephonic Switching System and Method", issued Jun. 30, 1992.

In addition to the operator agent terminal 16, the automatic call distributor also interfaces with different types of display terminals, such as a supervisor terminal with a CRT type of display 18 and a line printer 20. These display terminals 18 and 20 are used to display information concerning the operation of the call distribution system 10.

Referring now to FIG. 2, the display data storage compression system, which is preferably implemented within the automatic call distribution system 10 of FIG. 1, is seen to include an unformatted display data memory 22 in which unformatted display data, or raw data, is stored, preferably in memory blocks 1-N, wherein N is a preselected plural number. In addition, there is a formatting information memory 24 which is employed to store different sets of formatting information respectively relating to different types of formats associated with different types of display terminals 18 and 20. In the special case where there are only two different types of display terminals, such as in the automatic call distributor of FIG. 1, then there are only two sets of formatting information which are stored. The unformatted display data memory is passed through a formatter 26 which outputs the display data stored within memory 22 to a formatted display data buffer 28 in different formats in accordance with the formatting information associated with the particular type of display terminal 18 and 21 to which the formatted display data is to be displayed. The formatter selects the appropriate formatting information in accordance with the particular display terminal type to which the formatted data is to be sent.

Referring now to FIG. 3, the automatic call distributor block 11 is seen to include a microprocessor 30 with a program memory 32, preferably an EPROM, which controls a multiport switch 34 that interfaces with the line printer 20, the supervisor terminal with CRT 18 and the plurality of operator agent terminals 16 shown in FIG. 1. In addition, the microprocessor has a data storage memory 36 which preferably is employed as the unformatted data memory 22, the formatting information memory 24 and the formatting display data buffer 28 of FIG. 2.

Programs stored in the microprocessor 30 provides the means for selectively using the formatting information to provide the stored data to the different types of terminals in different formats respectively associated with the different types of display terminals.

The software formatter 26 constructs formatted data corresponding to the unformatted data from the unformatted display data memory 22 independently of the actual display terminal 18 and 20 at which the formatted data is to be displayed in a format associated with the selected display terminal type of the actual data terminal. The formatted stored data providing means, or formatter 26, has means for determining the type of display terminal requesting the display of data and means for selecting the formatting information associated with the display terminal type of the requesting display terminal. In addition, the formatted display data buffer 28, or memory area within memory 36, FIG. 3, has the data stored therein in a format constructed in accordance with the selected formatting information associated with the display terminal type of the requesting terminal. After the display data has been stored in the formatted display data buffer 28, it is transmitted to the requesting display terminal for display in the selected and appropriate format.

The formatting information preferably includes all of the categories of information of: (a) dimensions of the data to format, (b) location of the formatting buffer memory 28 for temporary storage of the formatted data, (c) display attributes for each of the preselected parts of the data, and (d) the location in the unformatted display data memory 22 of the unformatted data which is to be displayed. Preferably, the formatting information includes display attributes for each character of the textual data which is to be displayed.

The unformatted data is stored in blocks of memory and the formatter 26 includes means for formatting the data one block at a time. The formatting information thereby includes the identification of blocks of memory requested for display. The formatting information preferably also includes information specifying an offset into a block of memory of the beginning of the unformatted display data memory 22.

Likewise, the formatting buffer memory, or formatted display data buffer, 28 is arranged in blocks of buffer memory and the location of the buffer memory information includes the identification of the blocks of the buffer memory.

As previously noted, the appropriate formatting information used to format each of a plurality of blocks of the unformatted data in the unformatted display data memory 22. Within the microprocessor 30, and program memory 32, means are provided for storing a linked list of the formatting information with each set having all relative information for formatting the data of the associated block of unformatted data. The blocks of unformatted data are arranged to compose a file and the linked lists of sets of formatting information is updated based on determination of at least one of whether the unformatted data is (a) a new file, (b) a new block of data to format for a file already being formatted, and (c) being reformatted. While the display data storage compression system is preferably implemented in conjunction with the automatic call distribution system 10 of FIG. 1, it should be appreciated that the method is otherwise useful with other types of call distributors which have multiple types of display terminals which require different formats.

Regardless of the exact details of the automatic call distributor, in accordance with the present invention, a display data storage compression method is provided comprising the steps of: (a) storing data in unformatted form for display at different types of display terminals; (b) storing formatting information relating to different types of formats associated with said different types of display terminals; and (c) selectively using the formatting information to provide the store data to the different types of terminals in the different types of terminals in the different formats respectively associated with the different types of display terminals. Preferably, the step of constructing formatted data corresponding to the unformatted data is done independently of the actual display terminal at which the formatted data is to be provided for display.

In addition, the step of selectively using the formatting information includes the steps of (1) determining the type of display terminal requesting the display of data, (2) selecting the formatting information associated with the display terminal type of the requesting display terminal, (3) temporarily storing the unformatted data in a formatting buffer memory in a format constructed in accordance with the selected formatting information associated with the display terminal type of the requesting display terminal and (4) transmitting the data in the formatting buffer in the appropriate format to the requesting display terminal for display. The formatting information preferably includes (a) dimensions of the data to format, (b) location of formatting buffer memory for temporary storage of the formatted data, (c) display attributes for each of the preselected parts of the data, and (d) the location of the storing means of the unformatted data which is to be displayed. As noted above, the unformatted data is preferably stored in blocks of memory, and the step of formatting includes the step of formatting one block at a time.

The present invention is preferably implemented in conjunction with the automatic call distribution system 10 shown in FIG. 1 through employment of a computer program. In this computer program, a formatting language referred to as HIROFF is employed for the purpose of translating the raw data output to the formatted displayable text specific to the destined output device type. The output formatter is passed a pointer to the open raw text file which is to be formatted and the device type at which the text is to be displayed. It is also passed a pointer to a structure which contains information relevant to the building of the formatted text. As noted above, this structure includes the dimensions of the text to format, pointers to the blocks of memory which have been allocated for storing the text, the display attributes associated with each character of the text, and the number of the block of raw text to format. This allows the routine which is responsible for displaying the text to control which part of the text to display. This is necessary in the case of scrolling within text on a CRT display. Using a block number request keeps the entire raw text file from having to be formatted all at once. The calling routine is then responsible for controlling what block of text to format. It is the use of specific blocks of format which causes the need to keep specific information related to the block being formatted, such as the offset into the raw text file where that block's raw text begins. This is preferably accomplished by building a linked list of structures where each link of the list corresponds to a block of raw text. The structure in the linked list holds all relevant information for formatting that block of text.

Entries in the linked list are updated according to whether the raw text file to format is a new file, whether it is a new block of raw text to format, a raw text for which is already in the process of formatting, or whether the block of raw text has already been formatted and is being requested to be formatted again. Each entry's block information contains starting and exiting conditions for that block. The exiting conditions of a block are the starting conditions of the block following it. This information is necessary for the formatter 26 to determine how to start formatting a block of raw text. The block information also includes an offset into the raw text file where the block's raw text begins, and a count of raw text characters used to format a block of formatted text with the dimensions set up by the calling routine. When adding a link to the list for a block that has not been formatted before, the starting offset for the new block's raw text is determined by adding the raw text character count and the raw text offset of the previous block's format information.

Formatting of the raw text also depends on the type of device at which the output of the device will be displayed. In some cases, certain attributes have no meaning to certain devices, and these attributes are ignored for those device types.

While a detailed description of the preferred embodiment of the invention has been given, it should be appreciated that many variations can be made thereto without departing form the scope of the invention as set forth in the appended claims.

I claim:

1. In an automatic call distribution system having a plurality of different types of display terminals for display of data relating to operation of the distributor, a display data storage compression system, comprising:

means for storing data in unformatted form for display at different types of display terminals associated with the automatic call distribution system;

means for storing formatting information relating to different types of formats associated with said different types of display terminals associated with the call distribution system; and means for selectively using the formatting information to provide the stored data to the different types of terminals in the different formats respectively associated with the different types of display terminals.

2. The automatic call distribution system of claim 1 in which the selectively using means includes a formatter for constructing formatted data corresponding to the unformatted data independently of the actual display terminal at which the formatted data is to be displayed in a format associated with the terminal type of the actual data terminal.

3. The automatic call distribution system of claim 2 in which said formatting information includes at least one of the categories of information of (a) dimensions of the data to format, (b) location of formatting buffer memory for temporary storage of the formatted data, (c) display attributes for each of preselected parts of the data, and (d) the location in the storing means of the unformatted data which is to be displayed.

4. The automatic call distribution system of claim 3 in which formatting information includes all of the categories of information (a), (b), (c) and (d).

5. The automatic call distribution system of claim 3 in which the formatting information includes display attributes for each part of the data to be displayed.

6. The automatic call distribution system of claim 3 in which the unformatted data is stored in blocks of memory and the formatting means includes means for formatting the stored data one block at a time and the formatting information includes the identification of the blocks of memory requested for display.

7. The automatic call distribution system of claim 1 in which said selectively using means includes a formatter having means for determining the type of display terminal requesting a display of data, means for selecting the formatting information associated with the display terminal type of the requesting display terminal, means apart from the requesting display terminal for temporarily storing the unformatted data in a formatting buffer memory in a format constructed in accordance with the selected formatting information associated with the display terminal type of the requesting display terminal, and means for transmitting the formatted data in the formatting buffer to the requesting display terminal for display in the selected format.

8. The automatic call distribution system of claim 7 in which said formatting information includes information specifying an offset into a block of memory of the unformatted data storing means.

9. The automatic call distribution system of claim 7 in which the formatting buffer memory is arranged in blocks of buffer memory, and the location of the buffer memory information includes the identification of blocks of buffer memory.

10. The automatic call distribution system of claim 9 in which said formatting information is arranged in a plurality of formatting information sets respectively associated with and used to format a plurality of blocks of unformatted data in said data storing means.

11. The automatic call distribution system of claim 10 including means for storing a linked list of said formatting information sets with each set having all relevant information for formatting the data of its associated block of unformatted data.

12. The automatic call distribution system of claim 11 in which the blocks of unformatted data are arranged to compose a file, and including means for updating the linked list of sets of formatting information based on determination of at least one of whether the unformatted data is (a) a new file (b) a new block of data to format for a file being formatted and (c) is being reformatted.

13. The automatic call distribution system of claim 1 in which said data is textual information.

14. The automatic call distribution system of claim 1 in which the different types of terminals includes a line printer and a scrolling visual display.

15. In an automatic call distribution system having a plurality of different types of display terminals for display of data relating to the distributor, a display data storage compression method, comprising the steps of:

storing data in unformatted form for display at different types of display terminals;

storing formatting information relating to different types of formats associated with said different types of display terminals; and selectively using the formatting information to provide the stored data to the different types of terminals in the different formats respectively associated with the different types of display terminals of the automatic call distribution system.

16. The method of claim 15 which includes the step of constructing formatted data corresponding to the unformatted data independently of the actual display terminal at which the formatted data is to be displayed in a format associated with the display terminal type of the actual data terminal.

17. The method of claim 16 in which said formatting information includes (a) dimensions of the data to format, (b) location of formatting buffer memory for temporary storage of the formatted data, (c) display attributes for each of preselected parts of the data, and (d) the location in the storing means of the unformatted data which is to be displayed.

18. The method of claim 17 in which said formatting information includes all of the categories of information (a), (b), (c) and (d).

19. The method of claim 15 in which said step of selectively using includes the steps of determining the type of display terminal requesting a display of data, selecting the formatting information associated with the display terminal type of the requesting display terminal, temporarily storing the unformatted data in a formatting buffer memory apart from the requesting display terminal in a format constructed in accordance with the selected formatting information associated with the display terminal type of the requesting display terminal, and transmitting the formatted data in the formatting buffer to the requesting display terminal for display in the selected format.

20. The method of claim 19 in which the unformatted data is stored in blocks of memory and the step of formatting includes the steps of formatting one block at a time.

* * * * *